(12) United States Patent
Pham

(10) Patent No.: US 10,789,515 B2
(45) Date of Patent: Sep. 29, 2020

(54) IMAGE ANALYSIS DEVICE, NEURAL NETWORK DEVICE, LEARNING DEVICE AND COMPUTER PROGRAM PRODUCT

(71) Applicant: Kabushiki Kaisha Toshiba, Minato-ku (JP)

(72) Inventor: Quoc Viet Pham, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 236 days.

(21) Appl. No.: 15/917,881

(22) Filed: Mar. 12, 2018

(65) Prior Publication Data

US 2018/0349748 A1    Dec. 6, 2018

(30) Foreign Application Priority Data

May 30, 2017    (JP) .................................. 2017-106492

(51) Int. Cl.
*G06K 9/72* (2006.01)
*G06K 9/62* (2006.01)
(Continued)

(52) U.S. Cl.
CPC ......... *G06K 9/726* (2013.01); *G06K 9/00805* (2013.01); *G06K 9/342* (2013.01);
(Continued)

(58) Field of Classification Search
CPC ... G06T 7/10; G06T 7/11; G06T 7/194; G06T 2207/20084; G06K 9/34; G06K 9/6288; G06K 9/629; G06K 9/6292; G06K 9/726; G06K 9/342; G06K 9/00805; G06K 9/4628; G06K 9/627; G06K 9/6256;
(Continued)

(56) References Cited

U.S. PATENT DOCUMENTS

2013/0259371 A1    10/2013  Tuzel et al.
2016/0358337 A1*   12/2016  Dai ........................... G06T 5/10
(Continued)

FOREIGN PATENT DOCUMENTS

JP    2013-206458    10/2013

OTHER PUBLICATIONS

Wang, Peng, et al. "Towards unified depth and semantic prediction from a single image." 2015 IEEE Conference on Computer Vision and Pattern Recognition (CVPR). IEEE, 2015. (Year: 2015).*
(Continued)

*Primary Examiner* — Geoffrey E Summers
(74) *Attorney, Agent, or Firm* — Oblon, McClelland, Maier & Neustadt, L.L.P.

(57) ABSTRACT

According to an embodiment, an image analysis device includes one or more processors. The one or more processors configured to: calculate a feature map of a target image; calculate context score information representing context of each pixel in the target image on the basis of the feature map; calculate shape score information representing a shape of an object in at least one region included in the target image on the basis of the feature map; correct the shape score information in the at least one region using the context score information in a corresponding region; and output the corrected shape score information in the at least one region.

12 Claims, 6 Drawing Sheets

(51) Int. Cl.
G06K 9/46 (2006.01)
G06K 9/00 (2006.01)
G06K 9/34 (2006.01)
G06T 7/11 (2017.01)
G06N 3/04 (2006.01)

(52) U.S. Cl.
CPC .......... *G06K 9/4628* (2013.01); *G06K 9/627* (2013.01); *G06K 9/6256* (2013.01); *G06K 9/6262* (2013.01); *G06T 7/11* (2017.01); *G06N 3/04* (2013.01)

(58) Field of Classification Search
CPC .......... G06K 9/6262; G06N 3/02; G06N 3/04; G06N 3/0454; G06N 3/08; G06N 3/084
USPC .......................... 382/173, 180, 156, 157, 158
See application file for complete search history.

(56) References Cited

U.S. PATENT DOCUMENTS

2018/0089505 A1* 3/2018 El-Khamy ........ H01L 27/14683
2018/0253622 A1* 9/2018 Chen .................... G06N 3/0454

OTHER PUBLICATIONS

Park, Eunbyung, et al. "Combining multiple sources of knowledge in deep cnns for action recognition." 2016 IEEE Winter Conference on Applications of Computer Vision (WACV). IEEE, 2016. (Year: 2016).*

Dai, Jifeng, Kaiming He, and Jian Sun. "Instance-Aware Semantic Segmentation via Multi-task Network Cascades." 2016 IEEE Conference on Computer Vision and Pattern Recognition (CVPR). IEEE, 2016. (Year: 2016).*

Du, Xianzhi, et al. "Fused DNN: A deep neural network fusion approach to fast and robust pedestrian detection." 2017 IEEE winter conference on applications of computer vision (WACV). IEEE, 2017. (Year: 2017).*

Girshick, Ross, et al. "Rich Feature Hierarchies for Accurate Object Detection and Semantic Segmentation." 2014 IEEE Conference on Computer Vision and Pattern Recognition. IEEE, 2014. (Year: 2014).*

He, Kaiming, et al. "Mask R-CNN." arXiv preprint arXiv:1703.06870v2 (2017). (Year: 2017).*

Jifeng Dai et al, "Instance-Aware Semantic Segmentation via Multi-task Network Cascades", 2016 IEEE Conference on Computer Vision and Pattern Recognition (CVPR), IEEE, Jun. 27, 2016, XP033021496, DOI:10.1109/CVPR.2016.343, pp. 3150-3158.

Jonathan Long et al., "Fully Convolutional Networks for Semantic Segmentation", 2015 IEEE Conference on Computer Vision and Pattern Recognition (CVPR), Boston, MA, 2015, pp. 3431-3440.

Y Li et al, "Fully convolutional instance-aware semantic segmentation", arXiv:1611.07709, 2016, 9 pages.

* cited by examiner

IMAGE ANALYSIS DEVICE, NEURAL NETWORK DEVICE, LEARNING DEVICE AND COMPUTER PROGRAM PRODUCT

CROSS-REFERENCE TO RELATED APPLICATIONS

This application is based upon and claims the benefit of priority from Japanese Patent Application No. 2017-106492, filed on May 30, 2017; the entire contents of which are incorporated herein by reference.

FIELD

An embodiment described herein relates generally to an image analysis device, a neural network device, a learning device and a computer program product.

BACKGROUND

In a field of autonomous driving of vehicles, vehicles are controlled by analysing images taken by cameras. In such a technical field, context analysis and shape analysis are performed on images taken by cameras. In the context analysis performed on an image taken by a camera, semantic information about each pixel in the image is predicted. The semantic information represents which kind of category an object belongs to, e.g., the object is a vehicle or a human.

It is also known that the image analysis is achieved by a neural network device. The context analysis and the shape analysis, however, need to be performed by different networks. Even when the network for context analysis and the network for shape analysis are simply connected, the analysis performance does not improve.

DETAILED DESCRIPTION

According to an embodiment, an image analysis device includes one or more processors. The one or more processors configured to: calculate a feature map of a target image; calculate context score information representing context of each pixel in the target image on the basis of the feature map; calculate shape score information representing a shape of an object in at least one region included in the target image on the basis of the feature map; correct the shape score information in the at least one region using the context score information in a corresponding region; and output the corrected shape score information in the at least one region.

The following describes an embodiment with reference to the accompanying drawings. An image analysis device 10 according to the embodiment analyzes a target image, and outputs context score information and shape score information.

Figure 1:
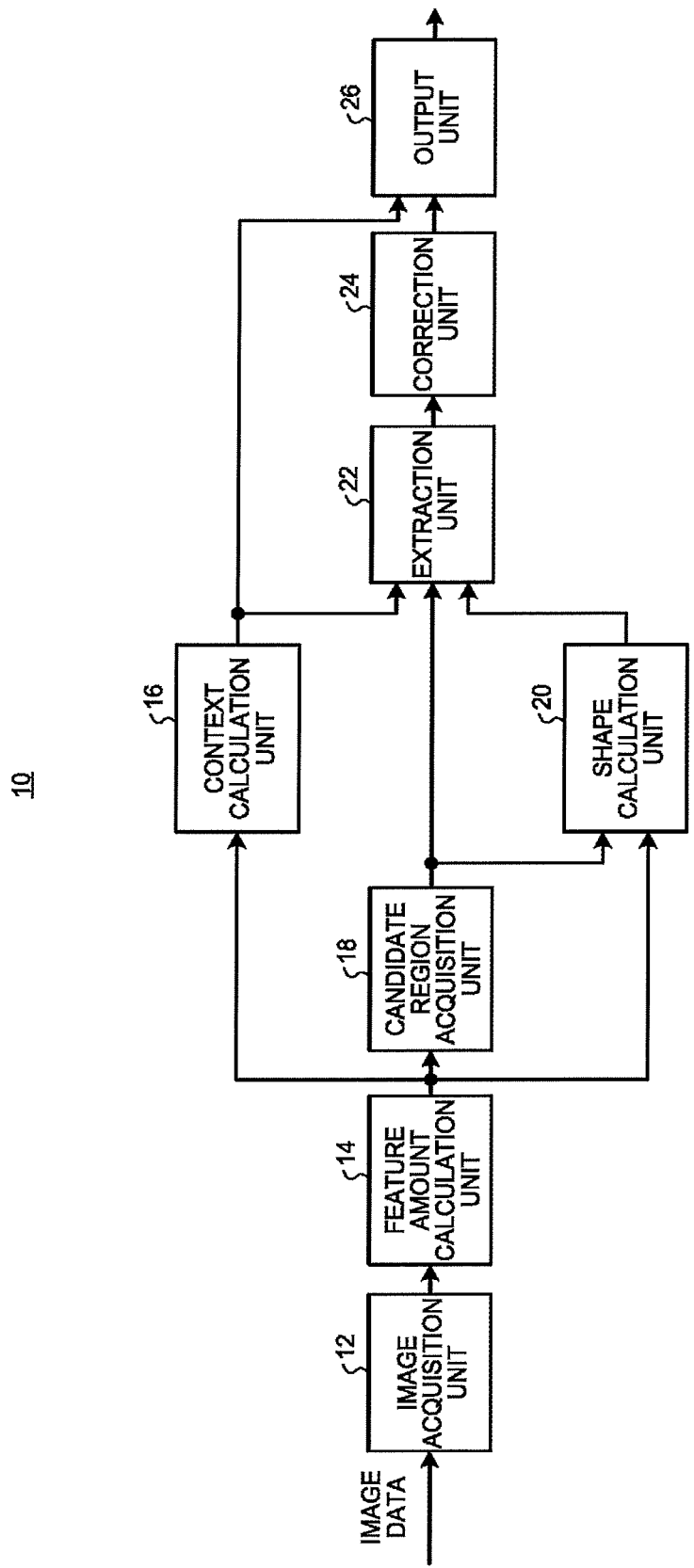
FIG. 1 is a schematic structural diagram of an image analysis device according to an embodiment.

FIG. 1 is a schematic diagram illustrating a structure of the image analysis device 10 in the embodiment. The image analysis device 10 includes an image acquisition unit 12, a feature amount calculation unit 14, a context calculation unit 16, a candidate region acquisition unit 18, a shape calculation unit 20, an extraction unit 22, a correction unit 24, and an output unit 26.

The image acquisition unit 12 acquires a target image from a camera, for example. The image acquisition unit 12 may acquire a target image from a storage device storing images or by receiving the target image via a network, for example. The image acquisition unit 12 sends the acquired target image to the feature amount calculation unit 14.

The feature amount calculation unit 14 receives the target image from the image acquisition unit 12. The feature amount calculation unit 14 calculates a feature map including a feature amount of the target image on the basis of the target image. The feature amount calculation unit 14 calculates the feature map including the feature amount used by the context calculation unit 16, the candidate region acquisition unit 18, and the shape calculation unit 20, which are subsequent units. The feature amount calculation unit 14 may calculate the feature map using a convolutional neural network (CNN), for example. The feature amount calculation unit 14 may calculates a feature map including a plurality of kinds of feature amounts. The feature amount calculation unit 14 sends the produced feature map to the context calculation unit 16, the candidate region acquisition unit 18, and the shape calculation unit 20.

The context calculation unit 16 receives the feature map from the feature amount calculation unit 14. The context calculation unit 16 calculates the context score information representing context of each pixel in the target image on the basis of the feature map.

The context is semantic information representing meaning of the object. The context score information includes a plurality of context scores. The context score may be identification information that identifies the context. The context score may be information indicating which category the object belongs to, for example. The category which the object belongs is information that identifies whether the object is a car, a human, a road, or the sky, for example. The context score may be geometric information such as a distance from a reference position (e.g., a camera position) to the object.

The context calculation unit 16 calculates the context score for each pixel in the target image. The pixel represents a location of a tiny region on the image. The pixel may not necessarily coincide with the pixel position in data. For example, the pixel may be a pixel unit in data representing the target image, a unit combining two adjacent pixels in the data, or a unit combining four adjacent pixels in the data.

Figure 2:
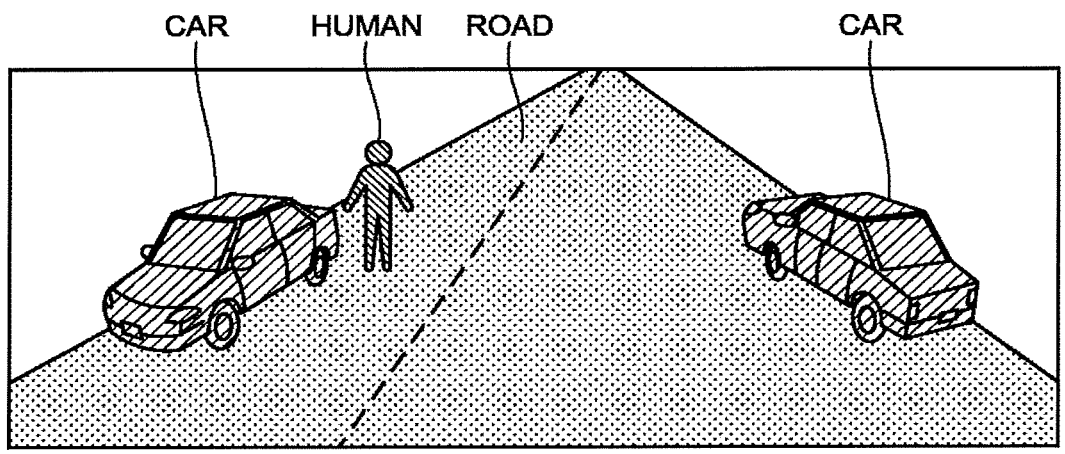
FIG. 2 is a schematic diagram illustrating context score information in a target image.

For example, when analysing an image taken by an on-vehicle camera, as illustrated in FIG. 2, the context calculation unit 16 calculates, for each pixel included in the target image, the context score representing whether the pixel indicates a car, a human, a road, or another object. The context calculation unit 16 can calculate the context score by a semantic segmentation technique described in Jonathan Long et al., "Fully convolutional networks for semantic segmentation", 2015 IEEE Conference on Computer Vision and Pattern Recognition (CVPR), Boston, Mass., 2015, pp.

3431-3440. The context calculation unit 16 can calculate, for each pixel in the target image, the context score representing a prior probability for each predetermined category, using the technique described in the foregoing literature.

The context calculation unit 16 sends the calculated context score information to the extraction unit 2i and the output unit 26.

The candidate region acquisition unit 18 acquires region information specifying each of at least one candidate region included in the target image. The candidate region is a partial region in which the object is probably present in the target image. The candidate region is sufficiently smaller than the target image and sufficiently larger than the pixel. The candidate region may be a region a user is highly interested in, which is called a region of interest (ROI), or a region in which an important object is highly probably included, for example. The candidate region may not coincide with a correct position of the object, for example.

The candidate region acquisition unit 18 may produce the region information on the basis of the feature map. The candidate region acquisition unit 18 may acquire, from an external device, the region information manually input by an operator, for example.

Figure 3:
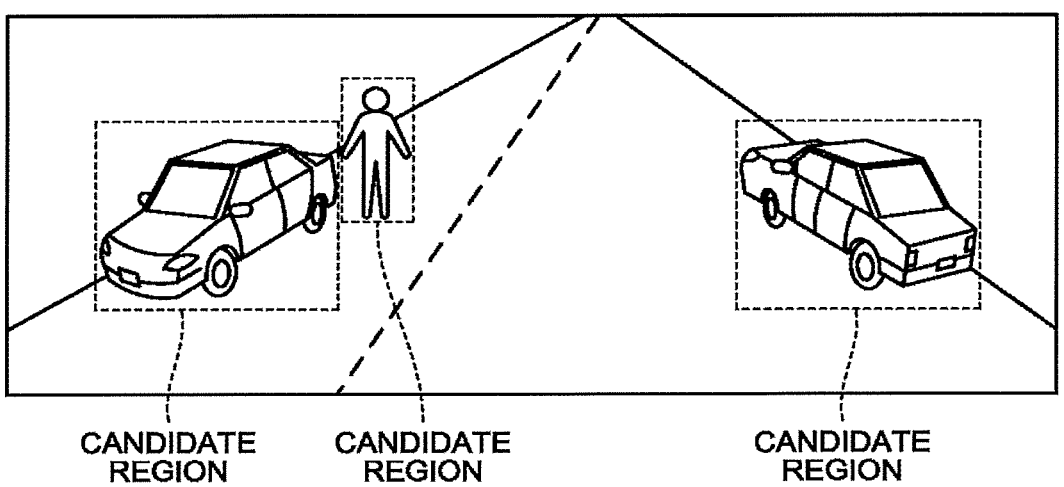
FIG. 3 is a schematic diagram illustrating exemplary candidate regions included in the target image.

For example, as illustrated in FIG. 3, when the image taken by the on-vehicle camera is analysed, the candidate region acquisition unit 18 may acquire the candidate regions in each of which the car is probably included and the candidate region in which the human is probably included. The candidate region acquisition unit 18 may acquire the candidate region having a rectangular shape, for example. The shape of the candidate region is not limited to the rectangle. The candidate region acquisition unit 18 may acquire the candidate region having another shape. The candidate region acquisition unit 18 sends the acquired region information to the shape calculation unit 20 and the extraction unit 22.

The shape calculation unit 20 receives the feature map from the feature amount calculation unit 14. The shape calculation unit 20 receives the region information from the candidate region acquisition unit 18. The shape calculation unit 20 calculates the shape score information representing the shape of the object, in each of at least one candidate region included in the target image on the basis of the feature map and the region information. The object may be the whole of the object such as a human or a car, or a specific part of the object such as an arm of a human or a head of a human.

The shape score information includes a plurality of shape scores. The shape score may be mask information that indicates whether the object is present for each pixel, for example. The shape score may be information that indicates one as the pixel representing the object and zero as the pixel representing a thing other than the object.

Figure 4:
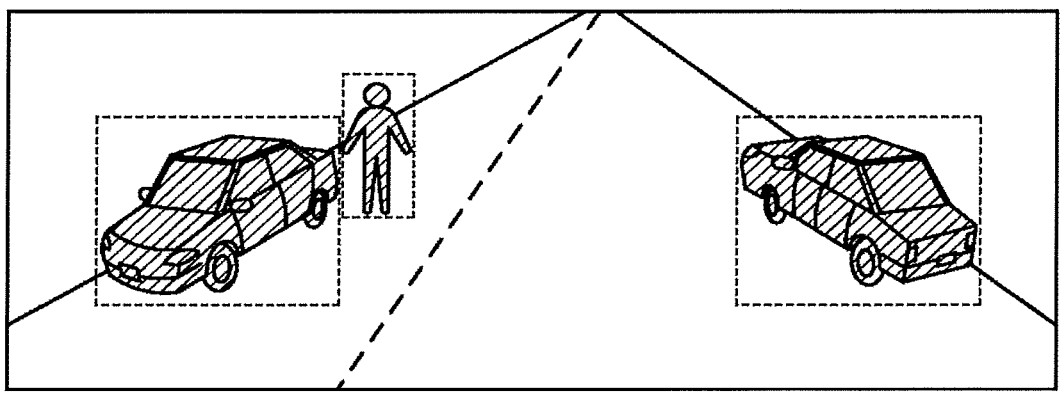
FIG. 4 is a schematic diagram illustrating exemplary shape score information.

For example, as illustrated in FIG. 4, when the image taken by the on-vehicle camera is analyzed, the shape calculation unit 20 may calculate the shape score information that indicates one as the pixel representing the object (the car or the human) in the candidate region and zero as the pixel representing a thing other than the object in the candidate region. The shape calculation unit 20 can calculate the shape score information using the semantic segmentation scheme described in Y. Li, H. Qi, J. Dai, X. Ji, and Y. Wei., "Fully convolutional instance-aware semantic, segmentation.", arXiv: 1611.07709, 2016. The shape calculation unit 20 can calculate, as the shape score information for each candidate region (e.g., ROI), a likelihood score map representing a likelihood of each pixel by the technique using a position-sensitive score map described in the foregoing literature.

The shape calculation unit 20 sends, to the extraction unit 22, the shape score information in each of at least one candidate region included in the target image.

The extraction unit 22 acquires the context score information in the target image from the context calculation unit 16. The extraction unit 22 acquires the region information from the candidate region acquisition unit 18. The extraction unit 22 acquires, from the shape calculation unit 20, the shape score information in each of at least one candidate region included in the target image.

The extraction unit 22 extracts the context score information in each of at least one candidate region on the basis of the context score information in the target image and the region information. The extraction unit 22 cuts out the context score information about a part corresponding to each candidate region from the context score information in the target image. The extraction unit 22 sends, to the correction unit 24, the shape score information and the context score information in association with each other (e.g., as a pair), for each of at least one candidate region. The more detailed structure of the extraction unit 22 is further described later with reference to FIG. 5.

The correction unit 24 acquires, from the extraction unit 22, the shape score information and the context score information that are associated with each other for each of at least one candidate region. The correction unit 24 corrects the shape score information in each of at least one candidate region using the context score information in the corresponding candidate region. For example, the correction unit 24 calculates the corrected shape score information on the basis of values obtained by multiplying the shape score by the context score for each pixel.

For example, the correction unit 24 corrects the shape score information in each of at least one candidate region by calculation based on expression (1).

$$J_n = f(I_n, S_n) \qquad (1)$$

In expression (1), f( ) represents the shape score information after the correction in the nth candidate region (n is an integer one or more), f( ) represents the shape score information before the correction in the nth candidate region, and $S_n$ represents the context score information in the nth candidate region.

In expression (1), f( ) is a predetermined function that corrects the shape score information using the context score information. For example, f( ) represents a function that multiples a plurality of shape scores included in the shape information by a plurality of con scores included in the context score information for each pixel. The function f( ) may further multiply the multiplied values by a certain coefficient, or additionally perform another calculation on the multiplied values. The function f( ) is not limited to the function that multiples the shape score by the context score for each pixel. The function f( ) may be another function.

The pixels included in an identical object highly probably have the same context. The context score information and the shape score information are highly correlated. Because of the high correlation, the correction unit 24 can increase accuracy of the shape score information by correcting the shape score information using the context score information. The correction unit 24 sends the corrected shape score information in each of at least one candidate region to the output unit 26.

The output unit 26 acquires the context score information in the target image from the context calculation unit 16. The output unit 26 acquires the corrected shape score information in each of at least one candidate region from the correction unit 24. The output unit 26 outputs, to the external device, the context score information in the target image and the corrected shape score information in each of at least one candidate region.

Figure 5:
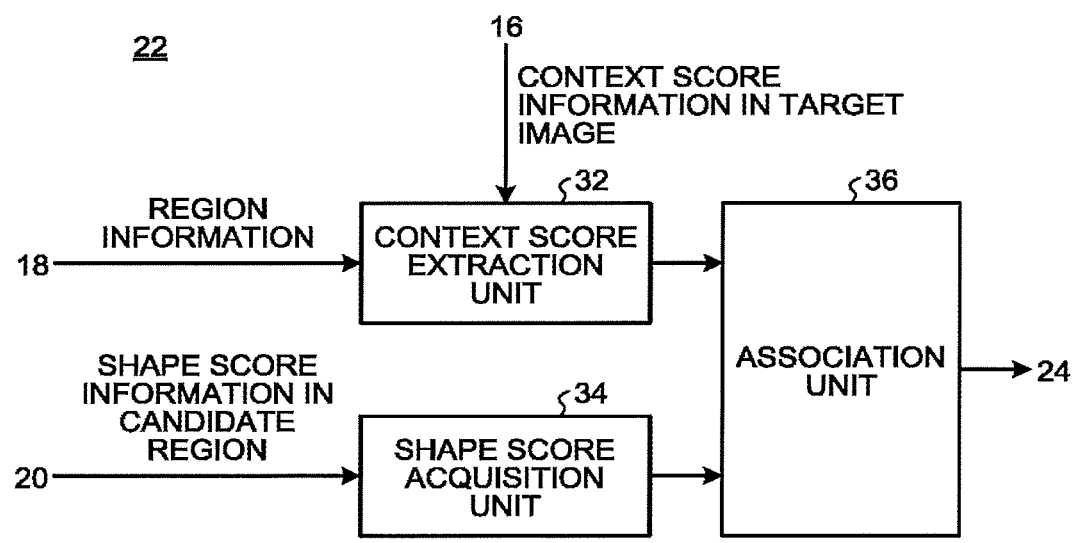
FIG. 5 is a schematic diagram illustrating an exemplary structure of an extraction unit.

FIG. 5 is a schematic diagram illustrating an exemplary structure of the extraction unit 22. The extraction unit 22 includes a context score extraction unit 32, a shape score acquisition unit 34, and an association unit 36.

The context score extraction unit 32 acquires the context score information in the target image from the context calculation unit 16. The context score extraction unit 32 acquires the region information from the candidate region acquisition unit 15. The context score extraction unit 32 extracts the context score information in each of at least one candidate region from the context score information in the target image on the basis of the region information.

The shape score acquisition unit. 34 acquires the shape score information in each of at least one candidate region from the shape calculation unit 20.

The association unit 36 acquires the context score information in each of at least one candidate region from the context score extraction unit 32. The association unit 36 acquires the shape score information in each of at least one candidate region from the shape score acquisition unit 34.

The association unit 36 outputs the context score information and the shape score information in association with each other for each of at least one candidate region, to the correction unit 24. The association unit 36 may output the context score information and the shape score information by arraying them in the order of identification numbers allocated for the respective candidate regions, for example.

Figure 6:
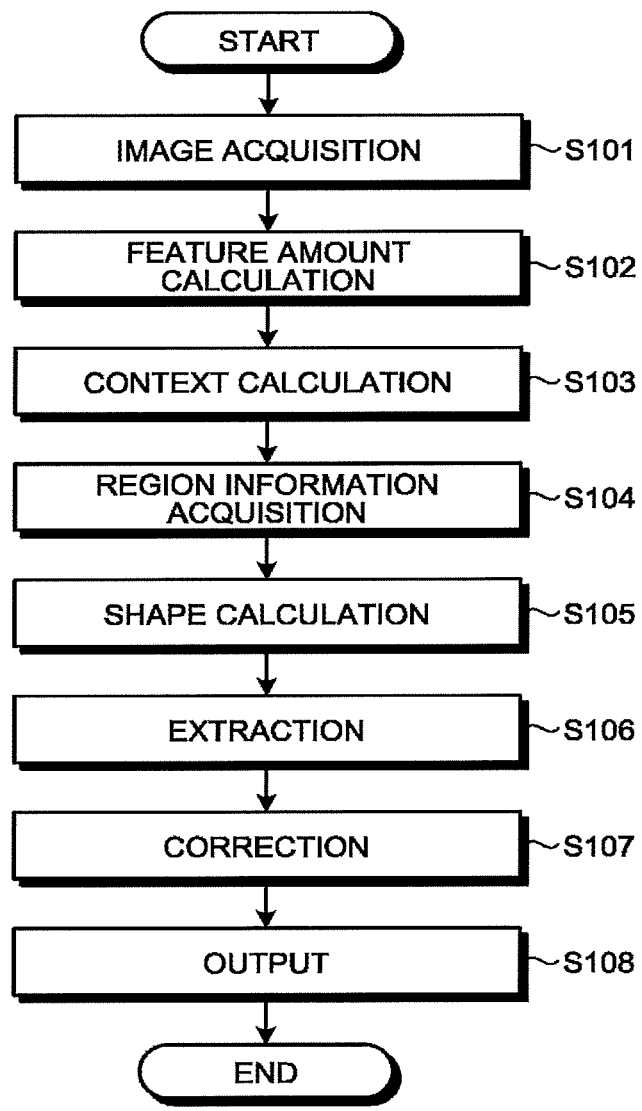
FIG. 6 is a flowchart illustrating processing performed by the image analysis device.

FIG. 6 is a flowchart illustrating processing performed by the image analysis device 10. The image analysis device 10 performs the processing in accordance with the steps in the flowchart illustrated in FIG. 6.

At S101, the image acquisition unit 12 acquires a target image. At S102, the feature amount calculation unit 14 calculates the feature map including the feature amount of the target image on the basis of the target image.

At S103, the context calculation unit 16 calculates the context score information representing the context of each pixel in the target image on the basis of the feature map. The context calculation unit 16 may calculate the context score information after S104 or S105, or may calculate the context score information in parallel with (e.g., simultaneously) S104 or S105.

At 2104, the candidate region acquisition unit 18 acquires the region information specifying each of at least one candidate region included in the target image. The candidate region acquisition unit 18 may produce the region information on the basis of the feature map or acquire the region information from the external device.

At S105, the shape calculation unit 20 calculates the shape score information representing the shape of the object in each of at least one candidate region included in the target image, on the basis of the feature map and the region information.

At S106, the extraction unit 22 extracts the context score information in each of at least one candidate region from the context score information in the target image. The extraction unit 22 cuts out, for each candidate region, the context score information about a part corresponding to the candidate region from the context score information in the target image. The extraction unit 22 associates the shape score information and the context score information with each other for each of at least one candidate region.

At S107, the correction unit 24 corrects the shape score information in each of at least one candidate region using the context score information in the corresponding candidate region. For example, the correction unit 24 calculates the corrected shape score information on the basis of values obtained by multiplying a plurality of shape scores included in the shape score information by a plurality of context scores included in the context score information for each pixel.

At S108, the output unit. 26 outputs, to the external device, the context score information in the target image and the corrected shape score information in each of at least one candidate region. After the processing at S109 ends, the image analysis device 10 ends the processing of the target image subjected to the analysis. Then, the image analysis device 10 performs the processing from S101 to S108 on the next target image, for example.

The image analysis device 10 according to the embodiment can calculate the context score information in the target image and the shape score information in each of at least one candidate region. Furthermore, the image analysis device 10 according to the embodiment corrects the shape score information using the context score information, thereby making it possible to accurately calculate the shape score information in each of at least one candidate region.

Figure 7:
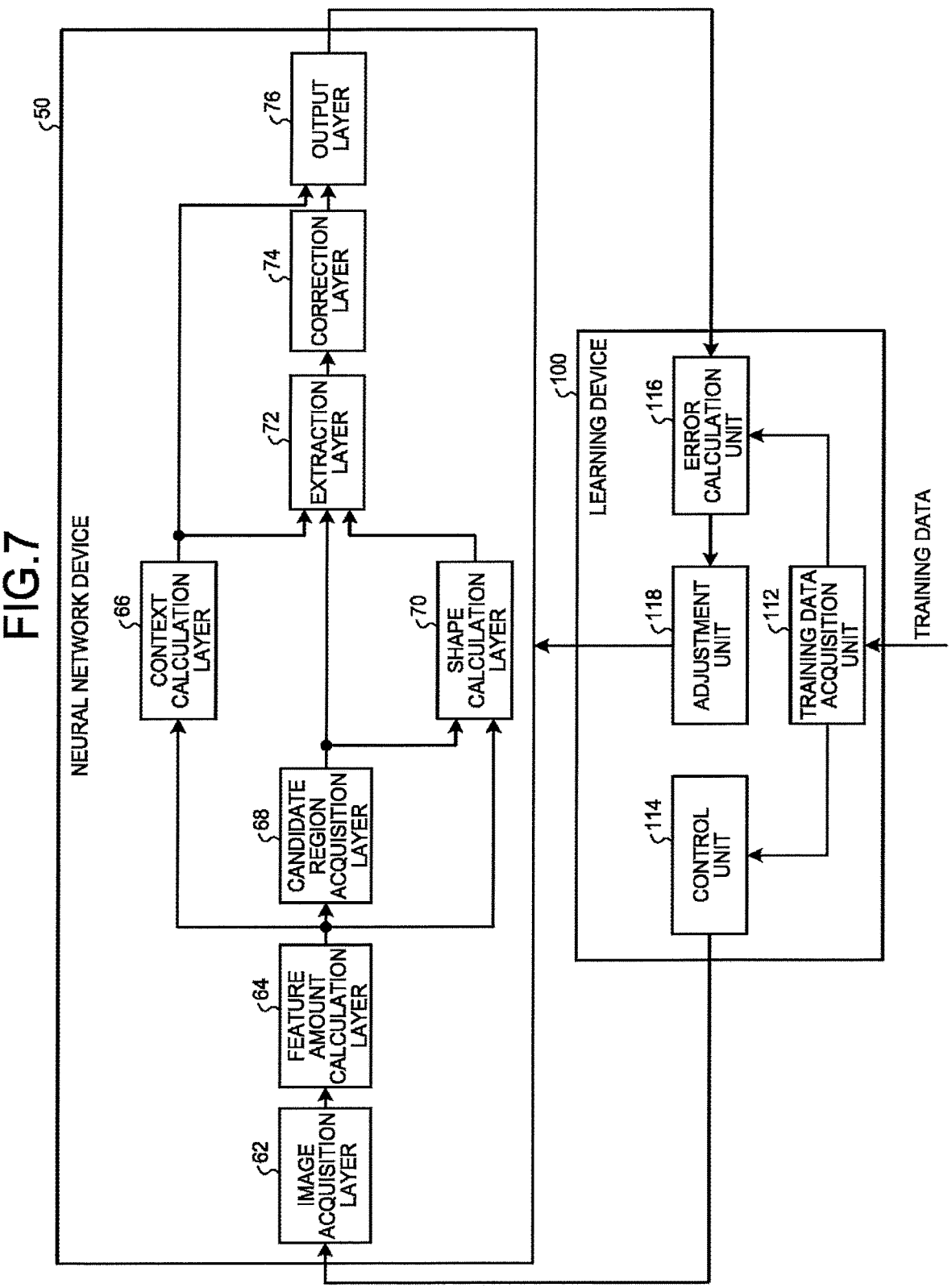
FIG. 7 is a schematic diagram illustrating each structure of a neural network device and a learning device.

FIG. 7 is a schematic diagram illustrating each structure of a neural network device 50 and a learning device 100 according to the embodiment. The image analysis device 10 according to the embodiment achieves the neural network device 50 illustrated in FIG. 7 by causing the neural network device 50 to perform learning using the learning device 100, for example.

The neural network device 50 includes an image acquisition layer 62, a feature amount calculation layer 64, a context calculation layer 66, a candidate region acquisition layer 68, a shape calculation layer 70, an extraction layer 72, a correction layer 74, and an output layer 76.

Each of the layers includes a single or multiple sub-network units. The sub-network unit acquires a plurality of signals (pieces of information) from the preceding layer, performs arithmetic processing on the acquired multiple signals, and sends a plurality of signals obtained as the result of the arithmetic processing to the succeeding layer. Some of the sub-network units may each include a return path in which its resulting signal returns to the sub-network unit.

Each of the sub-network unit performs a certain function arithmetic operation such as addition, multiplication, convolution operation, or a soft-max function on the multiple signals, for example.

For each sub-network unit, parameters "e.g., weights for multiplication or offsets for addition) for performing the arithmetic processing on the signals are set. The parameters for each sub-network unit are adjusted by the learning device 100 in learning.

The image acquisition layer 62 acquires a target image from the external device. The image acquisition layer 62 outputs values of a plurality of pixels included in the acquired target image to the feature amount calculation layer 64 serving as the succeeding layer. The image acquisition layer 62 functions as the image acquisition unit 12 illustrated in FIG. 1 as a result of the parameters for the sub-network units included in the image acquisition layer 62 being adjusted by the learning device 100.

The feature amount calculation layer 64 receives the multiple values of the pixels included in the target image from the image acquisition layer 62, and outputs the feature map including the feature amount of the target image. The feature amount calculation layer 64 functions as the feature amount calculation unit 14 illustrated in FIG. 1 as a result of the parameters for the sub-network units included in the feature amount calculation layer 64 being adjusted by the learning device 100.

The context calculation layer 66 receives the feature map from the feature amount calculation layer 64, and outputs the context score information representing the context of each pixel in the target image. The context calculation layer 66 functions as the context calculation unit 16 illustrated in FIG. 1 as a result of the parameters for the sub-network units included in the context calculation layer 66 being adjusted by the learning device 100.

The candidate region acquisition layer 68 receives the feature map from the feature amount calculation layer 64, and outputs the region information specifying each of at least one candidate region included in the target image. The candidate region acquisition layer 68 functions as the candidate region acquisition unit 18 illustrated in FIG. 1 as a result of the parameters for the sub-network units included in the candidate region acquisition layer 68 being adjusted by the learning device 100. The candidate region acquisition layer 68 may functions as an input layer that receives the region information from the external device and outputs the region information to other layers.

The shape calculation layer 70 receives the feature map from the feature amount calculation layer 64. The shape calculation layer 70 receives the region information from the candidate region acquisition layer 68. The shape calculation layer 70 outputs the shape score information representing the shape of the object in each of at least one candidate region included in the target image. The shape calculation layer 70 functions as the shape calculation unit 20 illustrated in FIG. 1 as a result of the parameters for the sub-network units included in the shape calculation layer 70 being adjusted by the learning device 100.

The extraction layer 72 receives tote context score information in the target image from the context calculation layer 66, the region information from the candidate region acquisition layer 68, and the shape score information in each of at least one candidate region from the shape calculation layer 70. The extraction layer 72 outputs the context score information in each of at least one candidate region. The extraction layer 72 outputs the context score information and the shape score information in association with each other for each of at least one candidate region, for example. The extraction layer 72 functions as the extraction unit 22 illustrated in FIG. 1 as a result of the parameters for the sub-network units included in the extraction layer 72 being adjusted by the learning device 100.

The correction layer 74 acquires the shape score information and the context score information in each of at least one candidate region from the extraction layer 72. The correction layer 74 outputs the corrected shape score information in each of at least one candidate region. The correction layer 74 functions as the correction unit 24 illustrated in FIG. 1 as a result of the parameters for the sub-network units included in the correction layer 74 being adjusted by the learning device 100.

The output layer 76 receives the corrected shape score information in each of at least one candidate region from the correction layer 74. The output layer 76 receives the context score information in the target image from the context calculation layer 66. The output layer 76 outputs, to the external device, the corrected shape score information in each of at least one candidate region and the context score information in the target image. The output layer 76 functions as the output unit 26 illustrated in FIG. 1 as a result of the parameters for the sub-network units included in the output layer 76 being adjusted by the learning device 100.

The learning device 100 trains the neural network device 50. The learning device 100 adjusts the multiple parameters set to the neural network device 50 before the neural network device 50 is used. The learning device 100 includes a training data acquisition unit 112, a control unit 114, an error calculation unit 116, and an adjustment unit 118.

The training data acquisition unit 112 acquires training data from the external device. The training data includes a set of training image data, training context score information, and raining shape score information in each of at least one candidate region. When the candidate region acquisition layer 68 acquires the region information from the external device, the training data further includes the region information.

The control unit 114 sends the training image data acquired by the training data acquisition unit 112 to the neural network device 50, and causes the neural network device 50 to calculate the context score information and the shape score information in each of at least one candidate region. When the candidate region acquisition layer 68 acquires the region information from the external device, the control unit 114 further sends the region information to the neural network device 50.

The error calculation unit 116 calculates a first error between the context score information calculated by the neural network device 50 using the training image data sent to the neural network device 50 and the training context score information. The error calculation unit 116 calculates a second error between the shape score information in each of at least one candidate region calculated by the neural network device 50 using the training image data sent to the neural network device 50 and the corresponding training shape score information.

The adjustment unit 118 adjusts the multiple parameters set to the neural network device 50 on the basis of the first error and the second error in relation to each of at least one candidate region. The adjustment unit 118 adjusts the multiple parameters such that a sum of the first error and the second error is minimized, for example. The adjustment unit 118 adjusts the multiple parameters by using back-propagated gradients in a technique such as back-propagation, for example.

The learning device 100 can perform training for calculating the context score information and training for calculating the shape score information simultaneously. The learning device 100, thus, can cause the neural network device 50 to effectively perform learning, thereby making it possible for the neural network device 50 to function as the accurate image analysis device 10.

Figure 8:
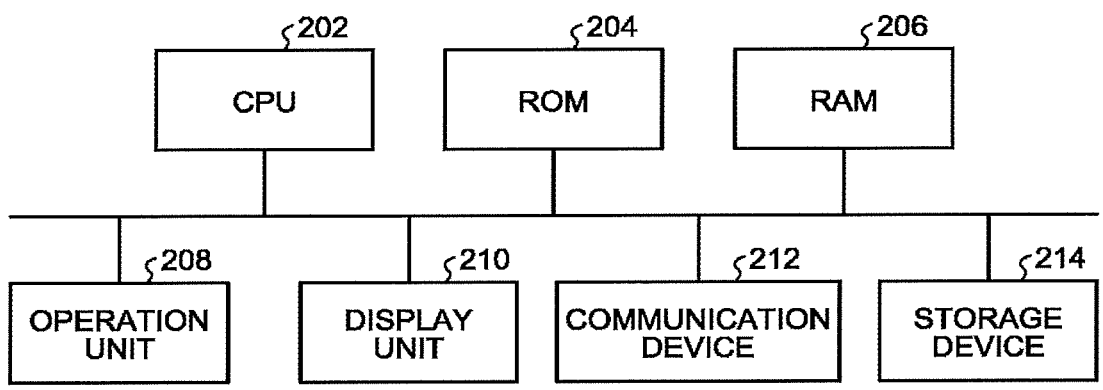
FIG. 8 is a hardware block diagram of an information processing apparatus according to the embodiment.

FIG. 8 is a hardware block diagram of an information processing apparatus 200. The information processing apparatus 200 is achieved by a hardware structure in the same manner as that of a typical computer, for example. The information processing apparatus 200 can function as the image analysis device 10, the neural network device 50, or the learning device 100 as a result of executing a certain corresponding program.

The information processing apparatus 200 includes a central processing unit (CPU) 202, a read only memory (ROM) 204, a random access memory (RAM) 206, an operation unit 208, a display unit 210, a communication device 212, and a storage device 214. The respective components are coupled to each other through a bus.

The CPU 202, which is a processor performing information processing, loads computer programs stored in the storage device 214 in the RAM 206, and executes the programs to control respective units such that input and output are performed and data is processed. The CPU 202 may be a single processor or composed of a plurality of processors. The information processing apparatus 200 may include a processor other than the CPU 202 for executing the programs. The ROM 204 stores therein a start program that reads a boot program from the storage device 214 to the RAM 206. The RAM 206 stores therein data as a working area of the CPU 202.

The operation unit 208, which is an input device such as a mouse or a keyboard, receives information input by the user's operation as an instruction signal, and outputs the instruction signal to the CPU 202. The display unit 210 is a display such as a liquid crystal display (LCD). The display unit 210 displays various types of information on the basis of display signals from the CPU 202. The communication device 212 communicates with external instruments via a network, for example. The storage device 214 is a hard disc drive or a flash memory, for example. The storage device 214 stores therein computer programs and an operating system that are executed by the information processing apparatus 200.

The programs executed by the information processing apparatus 200 in the embodiment are recorded and provided on a computer-readable medium such as a compact disc read only memory (CD-RCM), a flexible disk (FD), a compact disc readable (CD-R), and a digital versatile disc (DVD) as an installable or executable file. The programs executed by the information processing apparatus 200 in the embodiment may be stored in a computer connected to a network such as the Internet, and provided by being downloaded via the network. The programs executed by the information processing apparatus 200 in the embodiment may be provided or distributed via a network such as the Internet. The programs in the embodiment may be embedded and provided in the ROM 204, for example.

The program causing the information processing apparatus 200 to function as the image analysis device 10 includes an image acquisition module, a feature amount calculation module, a context calculation module, a candidate region acquisition module, a shape calculation module, an extraction module, a correction module, and an output module. The processor (CPU 202) of the information processing apparatus 200 reads the program from the storage medium (e.g., the storage device 214) and executes the program. The respective modules are loaded into a main storage device (RAM 206). The processor (CPU 202) functions as the image acquisition unit 12, the feature amount calculation unit 14, the context calculation unit 16, the candidate region acquisition unit 18, the shape calculation unit 20, the extraction unit 22, the correction unit 24, and the output unit. A part or all of the modules may be achieved by hardware implementation.

The program causing the information processing apparatus 200 to function as the neural network device 50 includes an image acquisition layer module, a feature amount calculation layer module, a context calculation layer module, a candidate region acquisition layer module, a shape calculation layer module, an extraction layer module, a correction layer module, and an output layer module. The processor (CPU 202) of the information processing apparatus 200 reads the program from the storage medium (e.g., the storage device 214) and executes the program. The respective modules are loaded into the main storage device (RAM 206). The processor (CPU 202) functions as the image acquisition layer 62, the feature amount calculation layer 64, the context calculation layer 66, the candidate region acquisition layer 68, the shape calculation layer 70, the extraction layer 72, the correction layer 74, and the output layer 76. A part or all of the modules may be achieved by hardware implementation.

The program causing the information processing apparatus 200 to function as the learning device 100 includes a training data acquisition module, a control module, an error calculation module, and an adjustment module. The processor (CPU 202) of the information processing apparatus 200 reads the program from the storage medium (e.g., the storage device 214) and executes the program. The respective modules are loaded into the main storage device (RAM 206). The processor (CPU 202) functions as the training data acquisition unit 112, the control unit 114, the error calculation unit 116, and the adjustment unit 118. A part or all of the modules may be achieved by hardware implementation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image analysis device comprising:
one or more processors configured to:
calculate a feature map of a target image;
calculate context score information representing context of each pixel in the target image on the basis of the feature map;
calculate shape score information representing a shape of an object in at least one region included in the target image to the exclusion of the remainder of the target image on the basis of the feature map, the at least one region being less than the whole target image;
extract context score information corresponding to the at least one region from the context score information representing context of each pixel in the target image;
correct the shape score information in the at least one region using the extracted context score information; and
output the corrected shape score information in the at least one region.

2. The device according to claim 1, wherein the one or more processors are further configured to output the context score information representing context of each pixel in the target image.

3. The device according to claim 1, wherein the one or more processors are further configured to produce region information specifying the at least one region included in the target image on the basis of the feature map.

4. The device according to claim 3, wherein the one or more processors are further configured to extract the context score information corresponding to the at least one region on the basis of the context score information representing context of each pixel in the target image and the region information for the target image.

5. The device according to claim 4, wherein the one or more processors are configured to:
   acquire the shape score information in the at least one region; and
   output the extracted context score information and the shape score information in association with each other for the at least one region.

6. The device according to claim 1, wherein the one or more processors are further configured to acquire region information specifying the at least one region included in the target image from an external device.

7. The device according to claim 1, wherein the context score information is information indicating a category to which an object belongs for each pixel.

8. The device according to claim 1, wherein the shape score information is mask information that indicates whether an object is present for each pixel.

9. The device according to claim 1, wherein
   the extracted context score information includes a context score of each pixel,
   the shape score information includes a shape score of each pixel, and
   the one or more processors are configured to calculate the corrected shape score information on the basis of a value obtained by multiplying the shape score by the context score for each pixel.

10. A neural network device comprising:
    one or more processors configured to implement:
       a feature amount calculation layer configured to output a feature map of a target image;
       a context calculation layer configured to receive the feature map and output context score information representing context of each pixel in the target image;
       a shape calculation layer configured to receive the feature map and output shape score information representing a shape of an object in at least one region included in the target image to the exclusion of the remainder of the target image, the at least one region being less than the whole target region;
       an extraction layer configured to receive the context score information in the target image and output the context score information in the at least one region; and
       a correction layer configured to receive the shape score information in the at least one region and the context score information in the at least one region, and output the corrected shape score information in the at least one region; and
       an output layer configured to output the corrected shape score information in the at least one region and the context score information in the target image.

11. A learning device to train the neural network device according to claim 10, the learning device comprising:
    one or more processors configured to:
       acquire a set of training image data, training context score information, and training shape score information in the at least one region;
       send the training image data to the neural network device and cause the neural network device to calculate the context score information and the shape score information for the at least one region;
       calculate a first error between the context score information and the training context score information, and a second error between the shape score information and the training shape score information in the at least one region; and
       adjust a parameter for the neural network device on the basis of the first error and the second error for the at least one region.

12. A non-transitory computer program product having a computer readable medium including programmed instructions, wherein the instructions, when executed by a computer, cause the computer to perform:
    calculating a feature map of a target image;
    calculating context score information representing context of each pixel in the target image on the basis of the feature map;
    calculating shape score information representing a shape of an object in at least one region included in the target image to the exclusion of the remainder of the target image on the basis of the feature map, the at least one region being less than the whole target image;
    extracting context score information corresponding to the at least one region from the context score information representing context of each pixel in the target image;
    correcting the shape score information in the at least one region using the extracted context score information; and
    outputting the corrected shape score information in the at least one region.

* * * * *